Sept. 11, 1923.  1,467,358
B. BORJA Y DIZON
EYEGLASS ATTACHMENT
Filed March 16, 1922  3 Sheets-Sheet 1
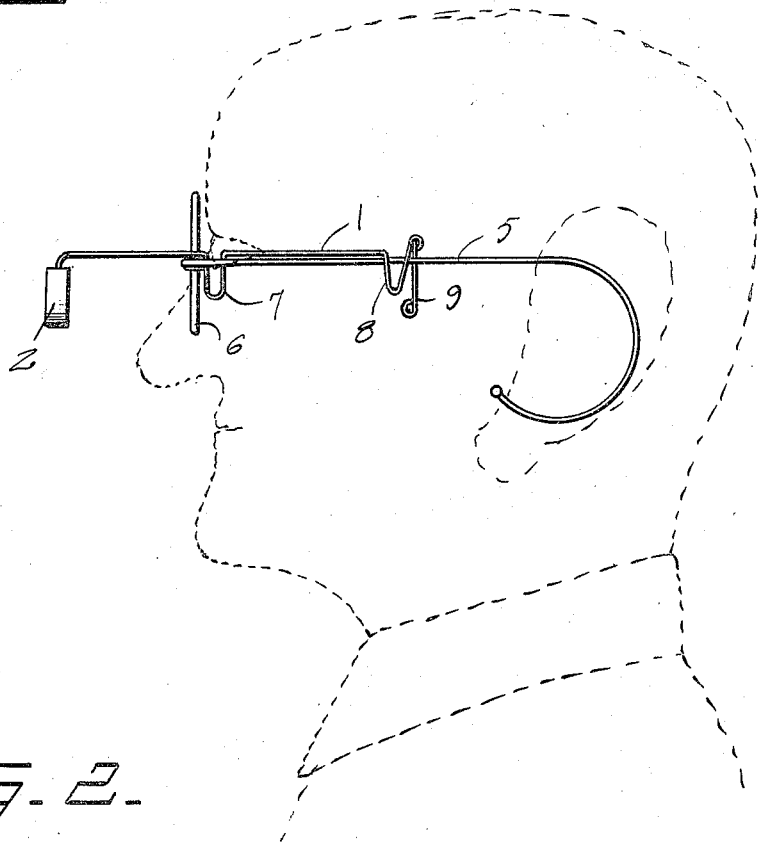
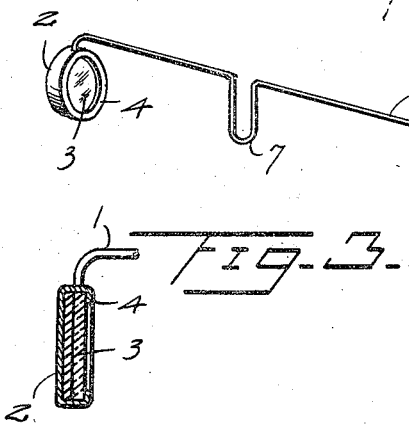
Inventor
Benito Borja y Dizon
By
Attorney Sept. 11, 1923.
B. BORJA Y DIZON
1,467,358
EYEGLASS ATTACHMENT
Filed March 16, 1922
3 Sheets-Sheet 2
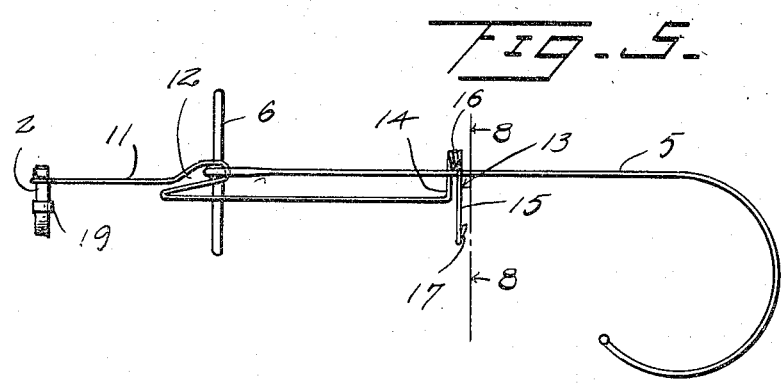
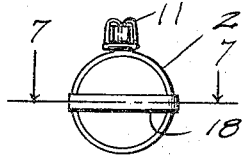
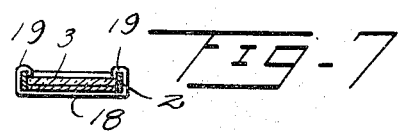
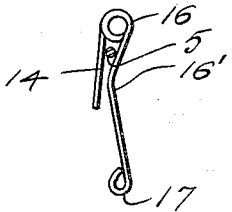
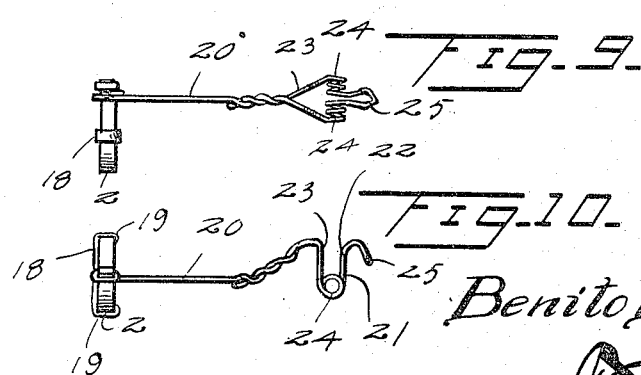
Inventor
Benito Borja y Dizon.
By
Attorney Sept. 11, 1923.
B. BORJA Y DIZON
EYEGLASS ATTACHMENT
Filed March 16, 1922
1,467,358
3 Sheets-Sheet 3
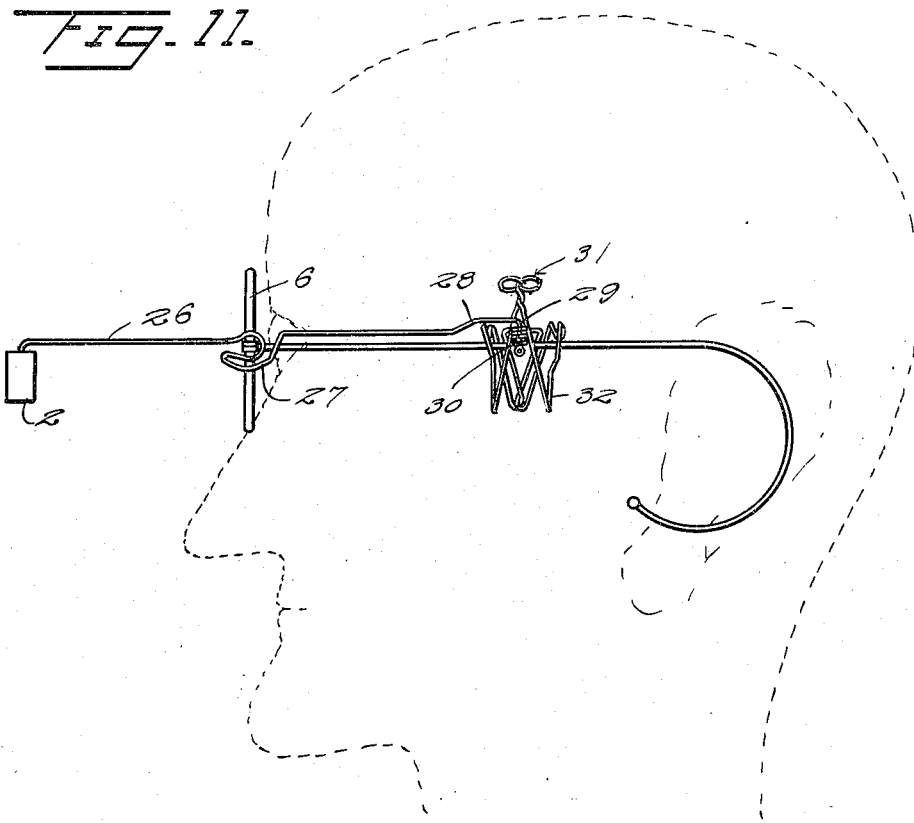
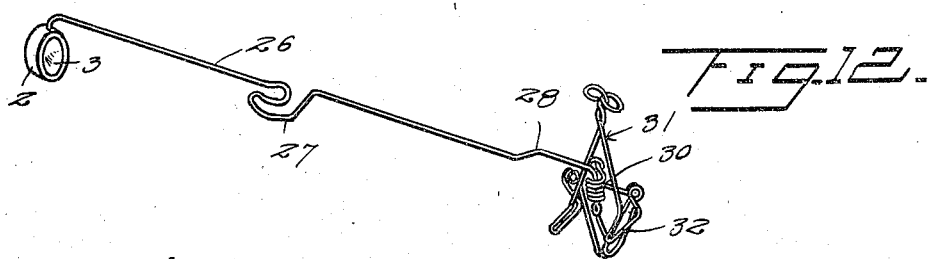
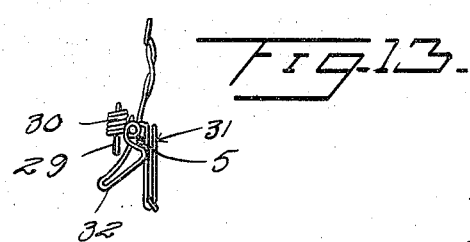
INVENTOR.
Benito Borja y Dizon
BY
ATTORNEY.

Patented Sept. 11, 1923.

1,467,358

UNITED STATES PATENT OFFICE.

BENITO BORJA Y DIZON, OF MANILA, PHILIPPINE ISLANDS.

EYEGLASS ATTACHMENT.

Application filed March 16, 1922. Serial No. 544,304.

*To all whom it may concern:*

Be it known that I, BENITO BORJA Y DIZON, a citizen of the Philippine Islands, residing at Manila, in the Philippine Islands, have invented certain new and useful Improvements in Eyeglass Attachments; and I do hereby declare the following to be a full, clear, and exact description of the invention, such as will enable others skilled in the art to which it appertains to make and use the same.

This invention relates to new and useful improvements in eyeglasses or spectacle attachments and has for its primary object the provision of a device which will permit the wearer to see objects and what is happening in rear thereof, thus providing a device especially adaptable for policemen, detectives and other officials to permit observation while standing with the back to the other person or persons.

Another object of this invention is the provision of an attachment of the above stated character which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a side elevation, illustrating an attachment applied to a spectacle worn by a person, Figure 2 is a perspective view illustrating the attachment, Figure 3 is a sectional view illustrating the mounting for the mirror, Figure 4 is a fragmentary perspective view, illustrating a modified form of my invention, Figure 5 is a side elevation illustrating another modified form of my invention, Figure 6 is an end view illustrating the same, Figure 7 is a sectional view taken on the line 7—7 of Figure 6, Figure 8 is a sectional view taken on the line 8—8 of Figure 5, Figure 9 is a side elevation illustrating another modified form of my invention, Figure 10 is a top plan view illustrating the same, Figure 11 is a side elevation, illustrating another modified form of my invention applied to a spectacle worn by a person, Figure 12 is a perspective view illustrating the device, and Figure 13 is an end view illustrating a clamp.

Referring in detail to the drawings, the numeral 1 indicates a supporting arm which carries at its forward end a mirror-supporting element 2 and in which is mounted a mirror 3 of a suitable size. The mirror-supporting element is arranged angularly to the supporting arm and is equipped with a flange 4 to receive the mirror within the same. The supporting arm is adapted to extend parallel with the temple bar 5 of a spectacle 6 worn by a person and the mirror is positioned forwardly beyond one of the lenses of the spectacle 6 and to one side of the center of the respective lens. A stop 7 is formed on the supporting arm 1 and is adapted to engage the rim of the spectacle 6 at a point where the temple bar is secured thereto for the purpose of limiting the forward movement of the supporting arm 1 and consequently causing the proper positioning of the mirror in advance of the lens so that the latter will properly reflect an object in rear of the wearer of the spectacle. An offset 8 is formed on the rear end of the supporting arm and engages the temple bar and has a catch 9 pivoted thereto which is positioned against the opposite side of the temple bar from the offset or between the temple bar and the temple of the wearer to firmly secure the device to the spectacle. With the device applied to the spectacle in the manner as before described, the wearer can readily observe objects in rear by moving the head from one side to the other and also in an upward and downward manner, and further the device is prevented from becoming disarranged by the stop 7 and the offset 8 cooperating with the catch 9. The object in rear of the wearer of the spectacle appears in the mirror and the wearer glancing into the mirror, which is located in front of the spectacle can determine just what is happening in rear of him. The device is of a small construction and when applied to the spectacle and worn by a person will hardly be noticeable and will not in any way interfere with the wearer seeing in front or to one side.

Referring to Figure 4, which illustrates a modified form of my invention, the catch or temple engaging element 9 is connected to the offset 8 by a ring or link 10 to permit the catch or bar to be easily moved relative to the offset to facilitate the application of the device to the temple bar of the spectacle.

Referring to Figures 5, 6, 7 and 8 which illustrate another modified form of my invention, the arm 11 is bent upon itself to form an open sided stop or loop 12 adapted to be positioned over the temple bar where the same attaches onto the spectacle for the purpose of limiting the forward movement of the arm or the mirror in respect to the lens of the spectacle.

The arm 11, after forming the loop 12, extends rearwardly in a plane below the forward portion of the arm and is bent to form a catch 13 consisting of spaced arms 14 and 15 connected by a coiled portion 16, and the arms are adapted to straddle the temple bar of the spectacle and cooperate with each other in gripping the same. The arm 15 is longer than the arm 14 and is bent to form an offset 16' adapted to prevent the catch from becoming accidentally disengaged from the temple bar by restricting the space between the arms 14 and 15 at one point. The free end of the arm 15 is bent to form a guide or loop 17 to facilitate the application of the arms of the catch to the temple bar. The forward end of the arm 11 carries the mirror 3 by the holder 2 and the latter is provided with a reinforcing clamp 18 which extends across the back of the holder and is bent to form grips 19 which engage over the edges of the holder and engage the mirror to hold the latter within the holder.

Referring to my modified form of invention as shown in Figures 9 and 10, the same is specially constructed for application to eyeglasses, or if desired may be applied to one of the rims of a spectacle, and consists of an arm 20 carrying at its forward end the holder 2 equipped with the usual mirror 3. The arm 20 at its opposite end is bent to form a catch 21 consisting of spaced arms 22 and 23 connected by a coiled portion 24 that is adapted to permit the arms to yield relative to each other so that they may be readily and quickly applied and removed from an eyeglass or spectacle. The free end of the arm 22 is offset to form a finger grip 25 to facilitate the application of the catch to the spectacle or eyeglass. The catch 21 is formed by bending the arm 20 upon itself and after the catch has been formed the free end of the arm is bent about the arm at its medial portion.

Referring to Figures 11 to 13 inclusive of the official drawings which illustrates another modified form of my invention, the arm 26 carries at its forward end a mirror frame 2 and the mirror 3 while a portion of the arm rearwardly of its forward end is offset or bent upon itself to form a hook-shaped stop 27 adapted to engage the temple bar 5 where the latter joins onto the frame of the spectacles 6. The rear portion of the arm 26 is offset upwardly as illustrated at 28 and has its free end bent angularly to form a pivot or journal portion 29 received by a journal 30 forming an integral part of a spring jaw clamp 31. The clamp 31 is applied to the temple bar 5 as shown in Figure 11 and is equipped with a finger piece 32 to facilitate the application and removal of the clamp from the temple bar. By having the arm 26 hinged to the clamp provides a construction which will permit the arm to be swung rearwardly to position the mirror and its holder 2 behind the ear of the wearer when not desiring to employ the device. It is to be understood that during the swinging movement of the arm rearwardly, the clamp is slid forwardly on the temple bar 5.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A device of the character set forth comprising a supporting arm, a mirror carried at one end of said arm and adapted to be arranged in advance of the lenses of a spectacle, and plurality of spaced apart means for detachably supporting the arm on the temple bar of the spectacles.

2. A device of the character set forth comprising a mirror adapted for disposition in front of and facing the lens of an eyeglass, an arm carrying said mirror, means to fasten said arm to an eyeglass, and an eyeglass-engaging stop on said arm to supplement the fastening thereof by said means.

3. A device of the character set forth comprising a mirror adapted for disposition in front of and facing the lens of an eyeglass, an arm carrying said mirror, means to fasten said arm to an eyeglass, and an eyeglass-engaging loop on said arm to supplement the fastening thereof by said means.

4. An article of the class described comprising a mirror adapted for disposition in front of and facing the lens of an eyeglass, an arm carrying said mirror, means to fasten the arm to an eyeglass, an eyeglass-engaging stop on said arm to supplement the fastening thereof by said means, said arm, means and stop being in a single piece, and said stop being located intermediate said means and the mirror.

5. An article of the character set forth comprising a mirror adapted for disposition in front of and facing the lens of an eyeglass, an arm carrying said mirror, and said arm having a portion integral therewith formed into a clasp to detachably secure the same to an eyeglass.

6. A device of the character set forth comprising a supporting arm, a mirror at one end of said arm, a stop formed on said arm for limiting the forward adjustment of the supporting arm on the temple bar of a spectacle, an offset formed on the arm and adapted to be positioned between the temple of the wearer of the spectacle and the temple bar of the spectacle, and a catch secured to the rear end of the arm for engagement with the temple bar.

7. A device of the character set forth comprising a supporting arm bent upon itself to form an open sided loop adapted to engage the temple bar where the same is secured to the rim of a spectacle, a mirror carried by the arm in advance of the lens of the spectacle, and means securing the arm to the temple bar of the spectacle.

8. A device of the character set forth comprising an arm, a mirror carried by said arm and located in advance of the lens of a spectacle, an offset formed on said arm to engage the spectacle, and a spring catch carried by the arm to engage the temple bar of the spectacle.

9. A device of the character set forth comprising an arm, a mirror carried by said arm and located in advance of the lenses of a spectacle, an offset portion on said arm and engaging one side of the temple bar of a spectacle, and an element pivoted to the offset and engaging the other side of the temple bar and located between the latter and the temple of the wearer.

10. A device of the character set forth comprising an arm, a mirror carried by the forward end of the arm, a hook-shaped stop formed on said arm and engaging the temple bar where the same is secured to the frame of a spectacle, and a clamp securing the arm to the temple bar.

In testimony whereof I affix my signature in presence of two witnesses.

BENITO BORJA Y DIZON.

Witnesses:
P. A. REMIGIO,
B. W. REUL.